United States Patent
Ouchi et al.

(10) Patent No.: US 6,592,227 B2
(45) Date of Patent: Jul. 15, 2003

(54) PROJECTION TYPE IMAGE-DISPLAY APPARATUS

(75) Inventors: Akihiro Ouchi, Kanagawa (JP); Katsumi Kurematsu, Kanagawa (JP); Yukihiko Sakashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/957,240

(22) Filed: Sep. 21, 2001

(65) Prior Publication Data

US 2002/0044261 A1 Apr. 18, 2002

(30) Foreign Application Priority Data

Sep. 27, 2000 (JP) .......... 2000-294511

(51) Int. Cl.$^7$ .......... G03B 21/14; G03B 21/00
(52) U.S. Cl. .......... 353/97; 353/31; 353/122
(58) Field of Search .......... 353/97, 31, 34, 353/36, 85, 122; 396/505, 507, 510; 358/236, 227

(56) References Cited

U.S. PATENT DOCUMENTS

| | | | | |
|---|---|---|---|---|
| 3,121,798 A | * | 2/1964 | Ploke | 250/229 |
| 4,560,263 A | | 12/1985 | Katsuma et al. | 354/195.1 |
| 5,465,718 A | * | 11/1995 | Hochman et al. | 348/164 |
| 5,798,805 A | * | 8/1998 | Ooi et al. | 349/10 |
| 5,926,656 A | * | 7/1999 | Imura et al. | 396/55 |
| 6,020,867 A | | 2/2000 | Shimada et al. | 345/87 |
| 6,243,055 B1 | * | 6/2001 | Fergason | 345/32 |

FOREIGN PATENT DOCUMENTS

| | | |
|---|---|---|
| JP | 59-106886 | 6/1984 |
| JP | 7-84553 | 3/1995 |
| JP | 10-78550 | 3/1998 |
| JP | 63-294540 | 12/1998 |

* cited by examiner

Primary Examiner—Russell Adams
Assistant Examiner—Andrew Sever
(74) Attorney, Agent, or Firm—Fitzpatrick, Cella, Harper & Scinto

(57) ABSTRACT

A projection type image-display apparatus includes a write signal processor for modulating the write signal transmitted to an optical modulator, a projected light quantity controlling for controlling the quantity of light transmitted or reflected by the optical modulator, and a control signal generator for controlling the write signal processor and the projected light quantity controller. The control signal generator is adapted to control the operation of controlling the quantity of projected light of the projected light quantity controller and that of modulating the write signal of the write signal processor on the basis of the brightness level of the input image signal.

6 Claims, 6 Drawing Sheets

PROJECTION TYPE IMAGE-DISPLAY APPARATUS

BACKGROUND OF THE INVENTION

1. Field of the Invention

This invention relates to a projection type image-display apparatus.

2. Related Background Art

With the advent of the so-called multimedia age in recent years, image-display apparatus are found in various scenes of life. Particularly, since projection type image-display apparatus are adapted to be used with a large display screen, they are currently very popularly used in various applications including presentations such as sales presentations, for which those of the front projection type may be adequate, and home theaters, for which those of the rear projection type are suited.

While CRTs are conventionally used as optical modulators of such projectors, liquid crystal panels and DMDs (digital mirror devices) adapted to modulate the quantity of light by modifying the angle of the mirror are currently in the main stream because they can meet the requirement of enhanced brightness and high definition. For example, Japanese Patent Application Laid-open No. 10-78550 describes a DMD. A projection type image-display apparatus comprising a liquid crystal panel or a DMD is so designed that the liquid crystal panel or the DMD is illuminated with light from a light source and an image is formed on the display screen by transmitted or reflected light coming to it by way of a projection optical system.

Meanwhile, projection type image-display apparatus have not got to the level of direct-viewing type CRT image-display apparatus in terms of image quality particularly from the viewpoint of the texture of the displayed image. The expression of "image quality (texture)" as used herein refers to dynamic range (contrast and gradation of images). Direct-viewing type CRT image-display apparatus realize a dynamic range higher than 10,000:1 for black and white images on the display screen.

On the other hand the dynamic range of a projection type image-display apparatus is principally determined by the performance of the optical modulator and approximately 300 to 400:1 in the case where a liquid crystal panel is used and approximately 600 to 800:1 in the case where a DMD is employed. Such a low dynamic range is partly due to the fact that, when a transmission type liquid crystal panel is used, leaking light is projected onto the screen showing one or more than one black areas and, when a reflection type liquid crystal screen or a DMD is used, scattered light is projected onto the screen also showing one or more than black areas.

In view of this problem, for example, Japanese Patent Application Laid-open No. 7-84553 proposes a projection type image-display apparatus comprising a scattering type liquid crystal panel. According to the above identified patent document, the projection optical system is provided with a large diameter aperture and a small diameter aperture, which are selectively used depending on the type of the input image to improve the dynamic range of the displayed image.

However, while an apparatus described in the above Japanese Patent Application Laid-open No. 7-84553 can display an image with an improved dynamic range, the brightness of the image is low to make the image poorly sharp.

SUMMARY OF THE INVENTION

Under the above identified circumstances, it is therefore the object of the present invention to provide a projection type image-display apparatus that can show a sharp image with a high dynamic range or a high image quality.

According to the invention, the above object is achieved by providing a projection type image-display apparatus comprising:

an optical modulator for displaying a gradational image by controlling the condition of transmission or reflection of light;

a lighting unit for irradiating said optical modulator with light;

a projection optical system for projecting the light emitted to and transmitted or reflected by said optical modulator;

a write signal processing means for modulating a write signal transmitted to said optical modulator;

a projected light quantity control means for controlling the quantity of light transmitted or reflected by said optical modulator; and a control signal generation means for controlling said write signal processing means and said projected light quantity control means;

said control signal generation means being adapted to control the operation of controlling the quantity of projected light of said projected light quantity control means and that of modulating the write signal of said write signal processing means on the basis of the brightness level of the input image signal.

DETAILED DESCRIPTION OF THE PREFERRED EMBODIMENTS

Now, the present invention will be described in greater detail by referring to the accompanying drawings that illustrate preferred embodiments of the invention.

Figure 1:
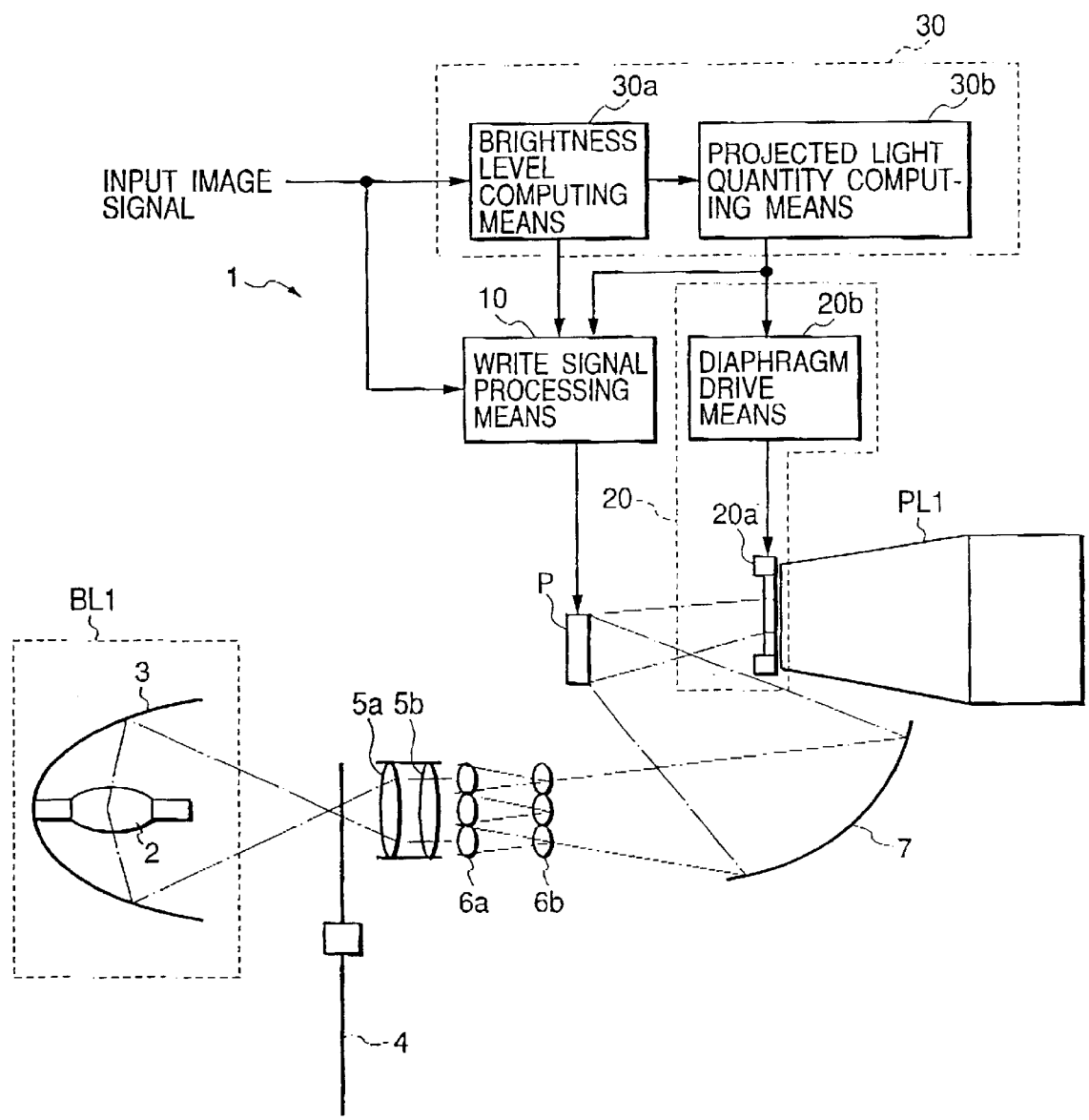
FIG. 1 is a schematic block diagram of an embodiment of projection type image-display apparatus according to the invention, illustrating its configuration.

FIG. 1 is a schematic block diagram of an embodiment of a projection type image-display apparatus according to the invention, illustrating its configuration. Referring to FIG. 1, the projection type image-display apparatus 1 comprises an optical modulator P for displaying a gradational image by controlling the condition of transmission of reflection of light, a lighting unit BL1 for irradiating said optical modulator with light and a projection optical system PL1 for projecting the light emitted to and transmitted or reflected by the optical modulator P. The light from the projection optical system PL1 is projected onto a display screen (not shown) to display an image there.

The lighting unit BL1 by turn comprises a reflector 3 and an arc tube 2. A color filter 4, telecentric lenses 5a, 5b and fly eye integrators 6a, 6b are arranged between the lighting unit BL1 and the optical modulator P. The light integrated by the fly eye integrators 6a, 6b is then converged to the optical modulator P by means of converging reflection mirror 7.

The projection type image-display apparatus 1 further comprises a write signal processing means 10 for modulating the write signal transmitted to the optical modulator P, a projected light quantity control means 20 for controlling the quantity of light transmitted or reflected by the optical modulator P and a control signal generation means 30 for controlling the write signal processing means 10 and the projected light quantity control means 20. The control signal generation means 30 is adapted to generate a control signal in such a way that, the higher the brightness level of the input image signal, the greater the quantity of projected light and the smaller the degree of modulation of the write signal or, the lower the brightness level of the input image signal, the smaller the quantity of projected light and larger the degree of modulation of the write signal.

The projection optical system PL1 of this embodiment preferably comprises a Schlieren optical system. The projected light quantity control means 20 comprises a movable diaphragm means 20a and a diaphragm drive means 20b and is arranged at a position not establishing a conjugated relationship with the optical modulator P. The projected light quantity control means 20 controls the opening of the movable diaphragm means 20a by means of the diaphragm drive means 20b as a function of the brightness level of the input image signal.

The control signal generation means 30 comprises a brightness level computing/processing means 30a for computationally determining the brightness level of the input image signal and a projected light quantity computing/processing means 30b for computationally determining the quantity of light to be projected from the projection optical system as a function of the computationally determined brightness level. Then, the control signal generation means 30 generates a control signal for controlling the projected light quantity control means 20 on the basis of the quantity of projected light as computationally determined by the projected light quantity computing/processing means 30b and a control signal for controlling the write signal processing means 10 on the basis of the brightness level computationally determined by the brightness level computing/processing means 30a and the quantity of projected light determined above.

The brightness level computing/processing means 30a computationally determines the largest value of the brightness signal of each pixel of each field or frame of the input image signal as the highest brightness. More specifically, the brightness level computing/processing means 30a can determine the largest value of the brightness signal of each pixel by sequentially comparing the input image signals in a field or frame as the highest brightness. Alternatively, the brightness level computing/processing means 30a can computationally obtain a cumulative histogram for the brightness signal of each pixel and determine the brightness level from which the cumulative histogram is found above a given level as the highest brightness.

Figure 2A:
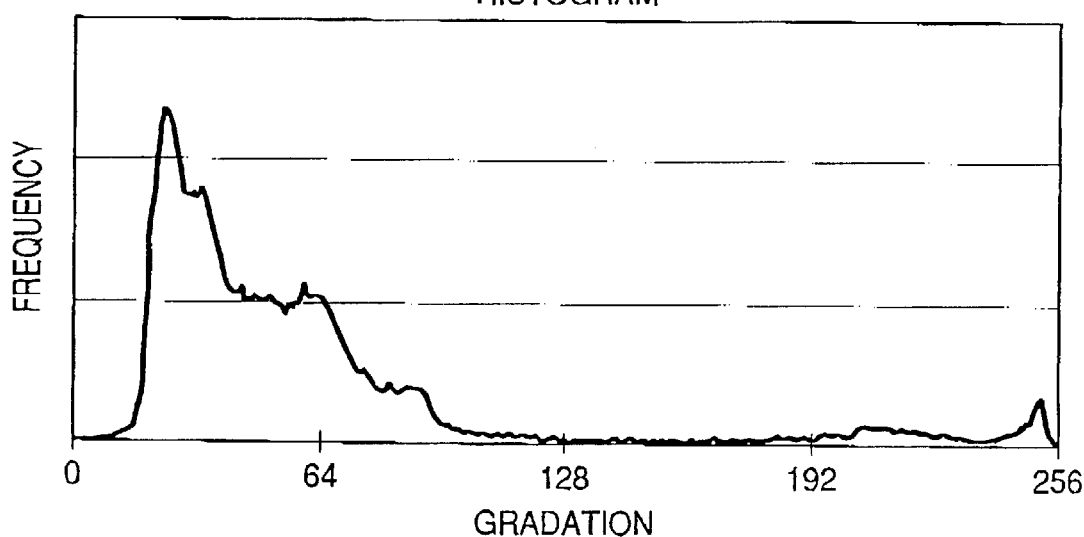
FIGS. 2A and 2B are histograms showing the brightness distribution of a field or a frame of an input image signal.
Figure 2B:
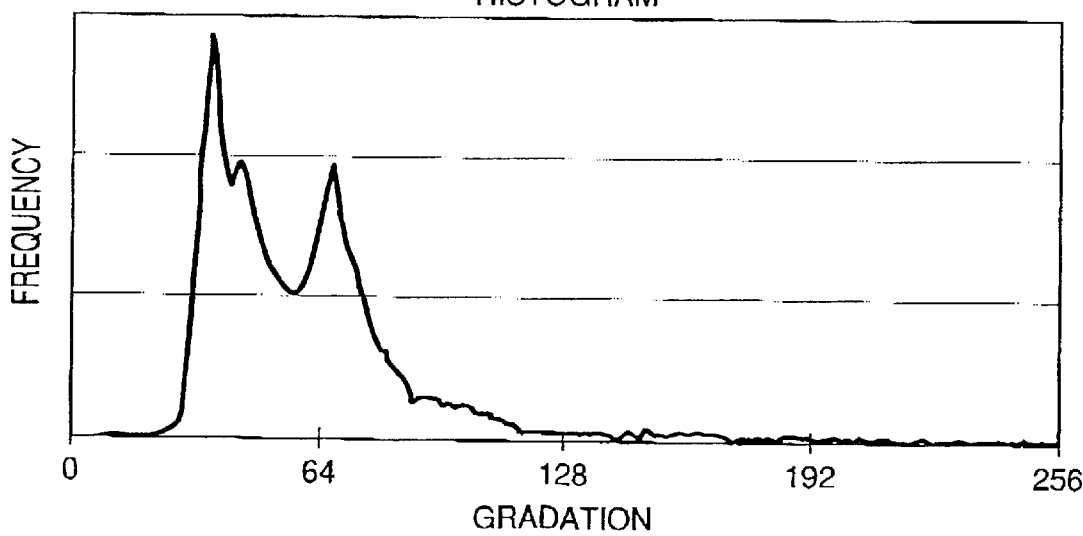
Figure 3A:
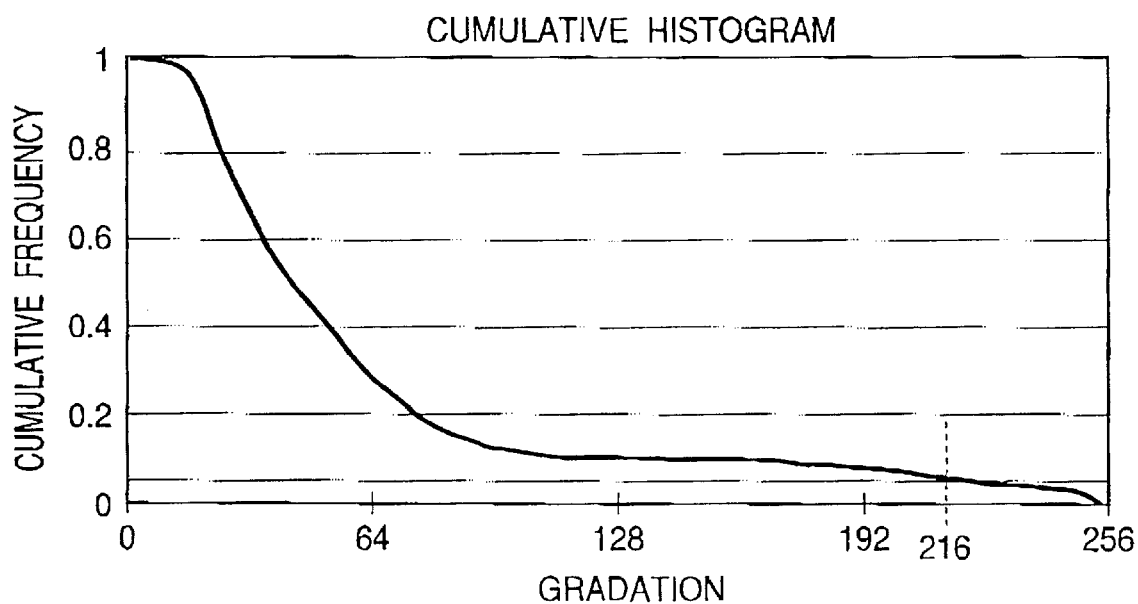
FIGS. 3A and 3B are cumulative histograms corresponding to the respective histograms of FIGS. 2A and 2B.
Figure 3B:
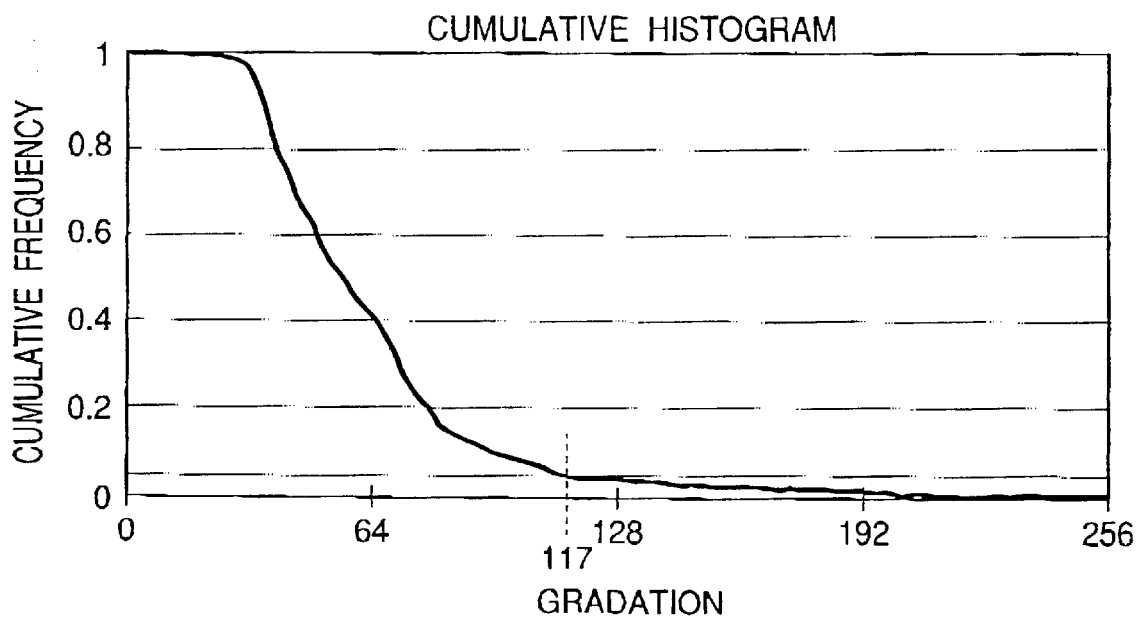

Assume here that an image signal showing a brightness distribution as shown in FIGS. 2A or 2B in a field or a frame is input. Then, the cumulative histograms of FIGS. 3A and 3B are obtained by arithmetically processing the graphs of FIGS. 2A and 2B in the descending order of brightness level. For example, the brightness level getting to 5% of all the image may be selected as the highest brightness. Then, the highest brightness will be 216 in FIG. 3A and 117 in FIG. 3B.

While it may be so arranged that the movable diaphragm means 20a is controlled in 255 steps so as to match the number of stages of gradation of the input image, it is preferable to select 8 to 16 steps for controlling the movable diaphragm means 20a from a practical point of view. When the movable diaphragm means 20a is controlled in 8 steps, the seventh step in the case of FIG. 3A and the fourth step in the case of FIG. 3B will be selected for operation in order to realize 87.5% and 50% of the largest quantity of light. The write signal processing means 10 preferably modulates the write signal so as to amplify it with an amplification ratio that is inversely proportional to the quantity of projected light.

The optical modulator P may be a device using a liquid crystal, a device of the MEMS (Micro Electro Mechanical Systems) type such as a DMD available from TI or a device comprising a micro-mirror. The optical modulator P may be either of the transmission type or of the reflection type. On the other hand, the movable diaphragm means 20a may be an iris diaphragm comprising a plurality of sectors 40 that can be operated to open and close the diaphragm by a rotary motion of a sector ring comprising cam grooves (not shown) receiving the respective sectors 40 as disclosed in Japanese Patent No. 2563334, while the diaphragm drive means 20b may be an ultrasonic motor as disclosed in Japanese Patent Publication No. 4-72471 (corresponding to U.S. Pat. No. 4,560,263).

Figure 5A:
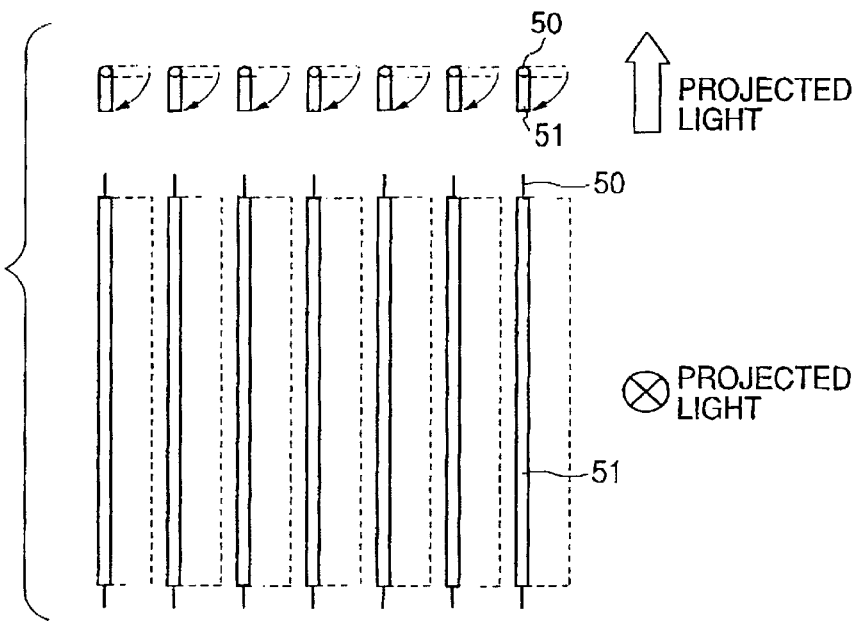
FIGS. 5A, 5B and 5C are schematic illustrations of a strip blind type iris diaphragm that can be used as movable diaphragms for the embodiment of FIG. 1.
Figure 5B:
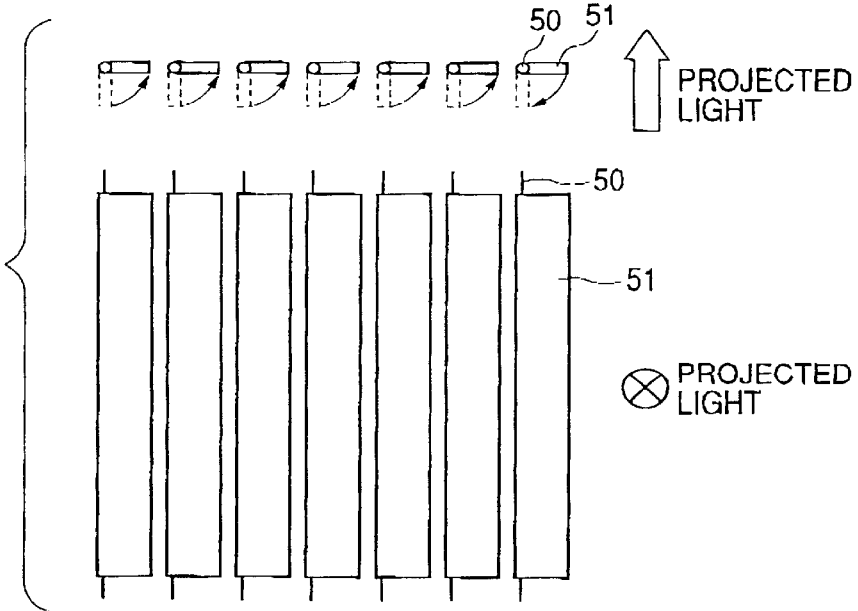
Figure 5C:
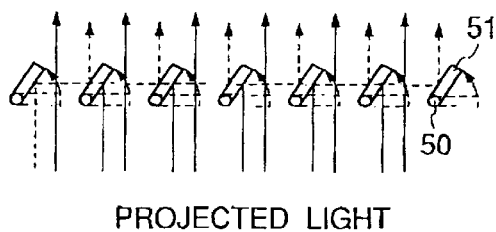

Alternatively, the movable diaphragm means 20a may be a so-called strip blind type diaphragm. Then, the diaphragm drive means 20b may be a cam motor. As shown in FIGS. 5A through 5C, a strip blind type diaphragm comprises a plurality of strip-shaped blind members (glaive member) 51, which can rotate around respective axes of rotation 50 rectangularly extending relative to the incoming projected light and provide a desired opening as they are rotated around the respective axes of rotation by a given angle of rotation. The blind members may preferably be displaced toward the incoming projected light. Alternatively, it may be so arranged that the foldable strip blind type diaphragm provides a desired opening when it is fully closed. The strip-shaped blind members (glaive member) 51 are opened in FIG. 5A, whereas they are closed in FIG. 5B.

Now, the operation of the above described embodiment will be described. If the input image signal shows a high brightness level (e.g., the highest brightness level 255, provided that the gradation of the input image signal is expressed by 8 bits), all the dynamic range of the optical modulator P will be used. Therefore, the input image signal will not be modulated by the write signal processing means 10 and the movable diaphragm means 20a is so controlled by the projected light quantity control means 20 as to maximize its opening. Thus, the light transmitted or reflected by the optical modulator P is used for projection by 100%. At this time, any unnecessarily transmitted or scattered light produced from the optical modulator P is also emitted through the maximally opened opening and the projection optical system PL1 to make the black areas bright. However, since the human eyes recognize the brightness of any spot on the displayed image only relatively by referring to the highest brightness, the bright black areas are not particularly noticeable when the brightness level of the displayed image is high.

If the brightness level of the input image signal is low (e.g., the highest brightness level 128, provided that the gradation of the input image signal is expressed by 8 bits), the dynamic range of the optical modulator P will be used by about 50% and hence the quantity of light that needs to be projected will also be about 50%. Therefore, the projected light quantity control means 20 controls the opening of the movable diaphragm means 20a so as to allow about 50% of the quantity of projected light to pass through it. Then, since the entire displayed image will be relatively dark under this condition, the write signal of the optical modulator P will be modulated and amplified by the write signal processing means 10 so as to use the dynamic range by 100%. In other words, the image will be displayed by using the full (100%) dynamic range of the optical modulator P for the projected light quantity of 50%. In this way, it is possible to display images with the actual display brightness that is held to a constant level as the quantity of projected light that is reduced by the projected light quantity control means 20 is compensated by the write signal processing means 10. At this time, the unnecessarily transmitted or scattered light produced from the optical modulator P is restricted from entering the projection optical system PL1 as a result of the narrowed aperture. Thus, the black color can be displayed without any undesired brightness.

Thus, with this embodiment of projection type image-display apparatus, when the quantity of projected light is reduced by the projected light quantity control means 20, any unnecessarily scattered light is restricted from entering to the projection optical system PL1 from the optical modulator P to display black without any undesired brightness. More specifically, the quantity of projected light is controlled as a function of the highest brightness level of the input image signal and the write signal for the optical modulator P is modulated to make it possible to improve the display of the black color in terms of brightness without changing the brightness level of the displayed image so that the dynamic range of the displayed image can be broadened relative to the 100% brightness displayed with the maximal quantity of light. On the other hand, when the brightness level of the displayed image is low, the image signal is expanded by modulating the input image signal to improve the gradation of the displayed image.

EXAMPLES

Now, the present invention will be described further by way of examples.

Example 1

Figure 4:
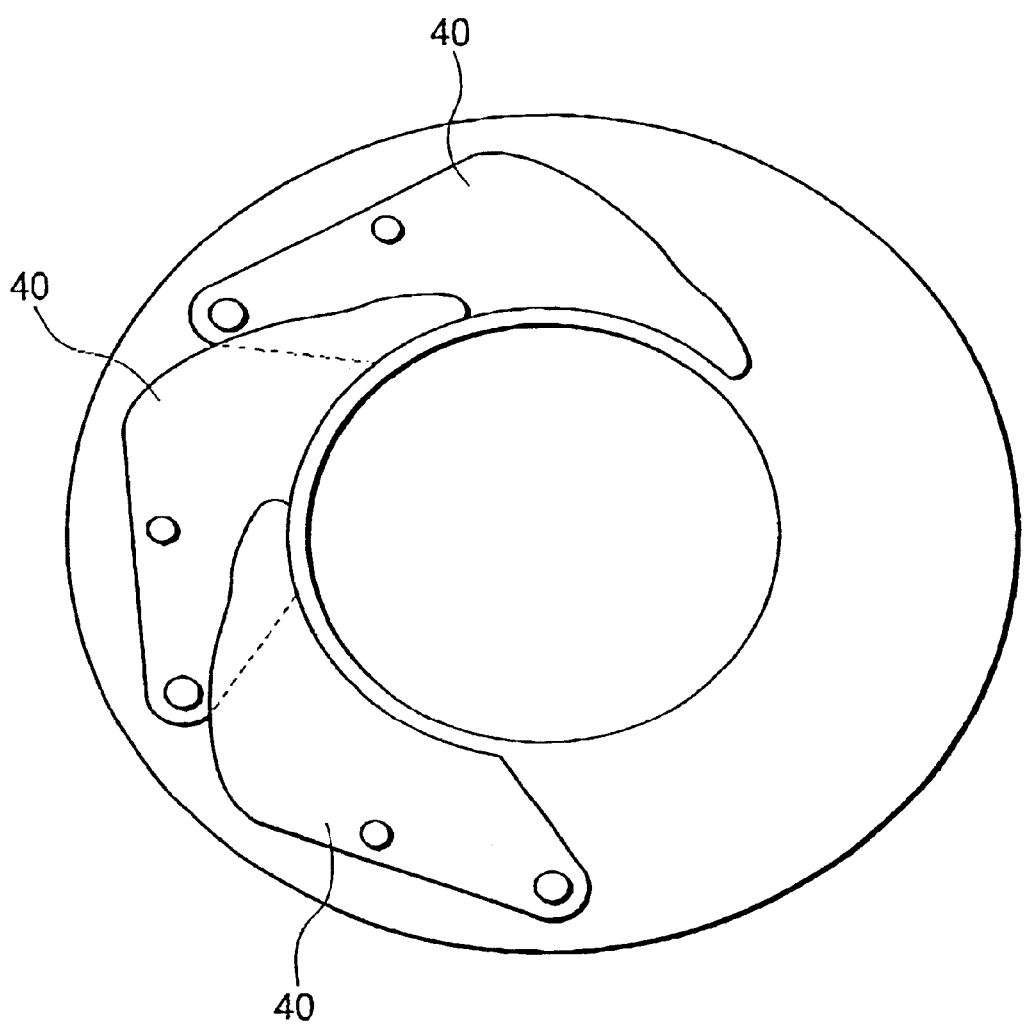
FIG. 4 is a schematic plan view of an iris diaphragm that is the movable diaphragm and adapted to be used for the embodiment of FIG. 1.

In this example, a reflection type DMD panel P is used for the optical modulator of the projection type image-display apparatus 1 of FIG. 1 and a movable diaphragm (movable diaphragm means) 20a and a projection optical system PL1 are arranged sequentially at the side where light reflected by the DMD panel P is directed. A screen (not shown) is arranged for displaying the projected image at a position downstream relative to the projection optical system PL1. The movable diaphragm 20a is of the type shown in FIG. 4, which is an iris diaphragm comprising a plurality of sickle-shaped sectors 50 arranged peripherally. The sectors 50 are forced to pivot simultaneously in a concerted manner so as to provide a desired aperture as a sector ring provided with a plurality of cam grooves receiving the respective sectors 50 is driven to rotate by an ultrasonic motor (diaphragm drive means) 20b.

A lighting unit BL1 is arranged so as to irradiate the DMD panel P with beams of light of three different colors (red, green and blue). The lighting unit BL1 comprises an arc tube 2 adapted to emit white light to the DMD panel and a reflector 3 for reflecting and converging the light emitted from the arc tube 2. A revolvably supported color filter 4, telecentric lenses 5a, 5b for converging the light transmitted through the color filter 4, fly eye integrators 6a, 6b for integrating the converged light and a convergence/reflection mirror 7 for converging the integrated light to the DMD panel P are arranged in the mentioned order between the lighting unit BL1 and the DMD panel P.

The DMD panel P is connected to the output terminal of a write signal processing means 10. The write signal processing means 10 and the ultrasonic motor 20b for driving the diaphragm are connected to the output terminal of a control signal generation circuit 30. Since the control signal generation circuit (means) 30 is described above, it will not be described here any further.

As described above, the movable diaphragm 20a and the write signal to the DMD panel P are controlled by the control signal generation means 30 on the basis of the brightness level of the input image signal in such a way that, the higher the brightness level of the input image signal, the greater the quantity of projected light and the smaller the degree of modulation of the write signal or, the lower the brightness level of the input image signal, the smaller the quantity of projected light and the larger the degree of modulation of the write signal.

Figure 6A:
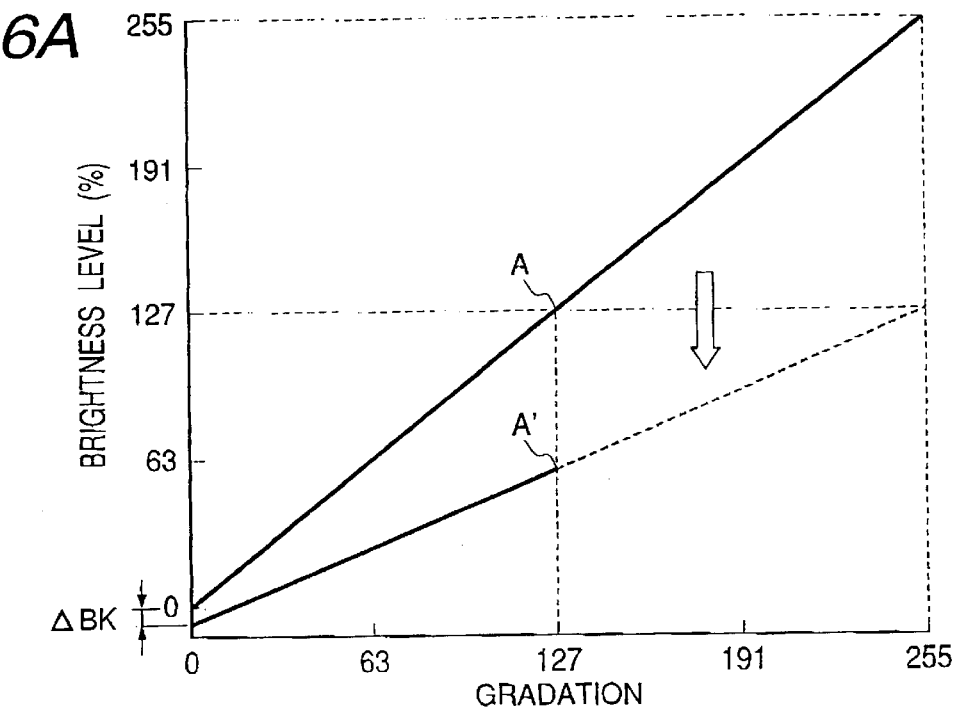
FIGS. 6A and 6B are graphs illustrating the modulation of a signal written to the optical modulator of a projection type image-display apparatus according to the invention.
Figure 6B:
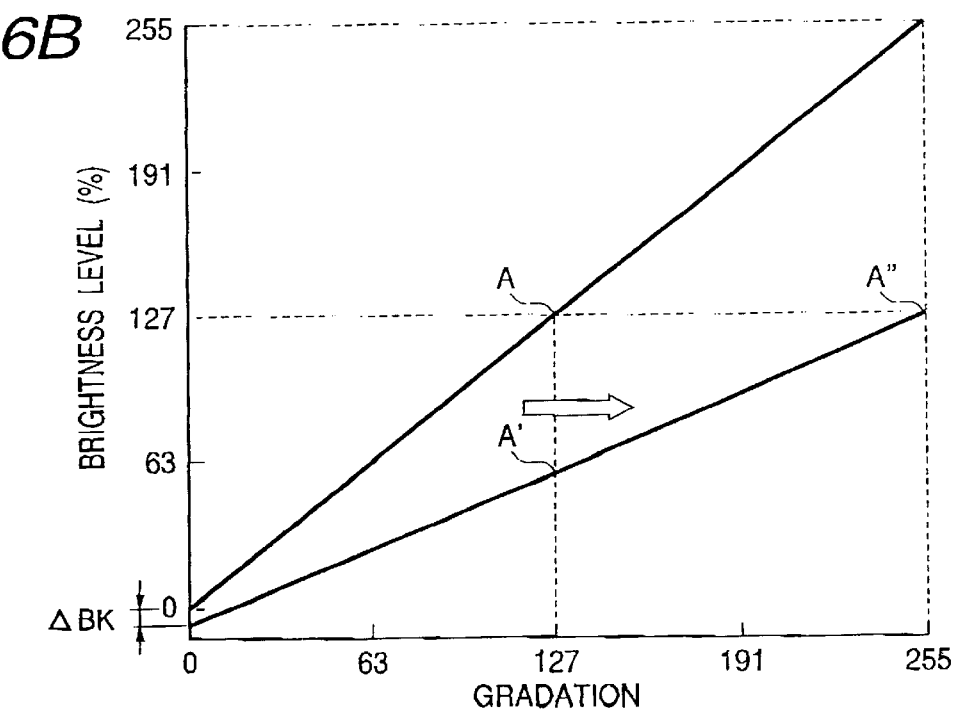

This operation will be described in greater detail by referring to FIGS. 6A and 6B. In FIG. 6A, the vertical axis indicates the brightness level expressed in 8 bits relative to the gradation of the input image signal obtained when the diaphragm is fully opened and the light reflected from the DMD panel is used by 100%, while the horizontal axis indicates the gradation of the input image signal. For the purpose of simplicity, the brightness level is assumed to change linearly relative to the change in the gradation of the input image signal. For example, the diaphragm is controlled so as to become fully open in order to use the light reflected by the DMD panel by 100% and the write signal is not modulated when the computed highest brightness of the input image signal is 255.

The diaphragm is then so controlled as to allow the quantity of projected light to be 50% when the computed highest brightness of the input image signal is 128 because it is only necessary to use the light reflected by the DMD panel by 50%. As a result of controlling the diaphragm so as to allow the quantity of projected light to be 50%, the brightness level of the display image will be uniformly 50%. For example, if the brightness level is 127 when the gradation of the input image signal is 127 (as indicated by point A in FIG. 6A), then the brightness level will fall to about 64 (as indicated by point A' in FIG. 6A) The input image signal is then modulated to compensate the loss. More specifically, point A' is brought up to point A" as shown in FIG. 6B by amplifying the input image signal by a factor of 2.

Meanwhile, as a result of reducing the quantity of projected light, it is now possible to lower the 0 brightness level (pure black) if compared with its counterpart obtained when the quantity of projected light is raised as shown by ΔBK in FIG. 6A. In other words, when the brightness level is low, black can be displayed very dark as a result of suppressing unnecessary scattered light coming from the DMD panel P. Additionally, the intermediary brightness levels of the displayed image are held unchanged by compensation as the quantity of projected light is controlled and the write signal transmitted to the DMD panel P is modulated accordingly.

As pointed out above, with this example, when the highest brightness level of the input image signal is low, black can be displayed very dark without changing the intermediate brightness levels of the displayed image. Therefore, it is possible to display the image with an expanded dynamic range by referring to white as displayed when the level of the highest brightness of the input image signal is high. On the other hand, when the quantity of projected light is reduced, it is possible to expand the gradation at a low brightness level by modulating and amplifying the write signal to the DMD panel.

Example 2

While the movable diaphragm (movable diaphragm means) 20a of Example 1 is an iris diaphragm and the desired aperture is produced by driving it by means of an ultrasonic motor (diaphragm drive means) 20b, the movable diaphragm 20a of Example 2 is made to comprise a plurality of strip-shaped blind members (glaive member) 51, which can rotate around respective axes of rotation rectangularly extending relative to the incoming projected light and provide a desired opening toward the incoming projected light as they are drive to rotate synchronously around the respective axes of rotation by a motor (diaphragm drive means) (not shown) as shown in FIGS. 5A and 5B. FIG. 5C illustrates a plurality of strip-shaped blind members that can be opened and closed toward the side to which projected light proceeds. With this arrangement, the projected light that is reflected by a strip-shaped blind member 51 may be reflected again by an adjacent blind member 51 before exiting from the diaphragm. However, this problem can be avoided as the blind members 51 are opened and closed toward the incoming projected light.

In FIG. 5A, the diaphragm 20a comprising the strip-shaped blind members is fully opened (to allow the projected light to pass by 100%). In FIG. 5B, on the other hand, the diaphragm 20a comprising the strip-shaped blind members is completely closed. However, it will be appreciated from FIG. 5B that light can pass through the diaphragm if the latter is completely closed. The extent to which light is allowed to pass through the diaphragm when the latter is completely closed may be determined by establishing a relationship between the brightness level of the input signal and the quantity of light allowed to pass through the diaphragm. Otherwise, the configuration of the apparatus of this example is same as that of the apparatus of Example 1. Thus, like Example 1, this example provides the effect of broadening the dynamic range. It is also possible to obtain an projected image with a more uniform quantity of light distribution because the aperture of the projection optical system is controlled uniformly.

As described above, according to the invention, it is possible to display black really dark, while maintaining the brightness of the displayed image to a constant level, by lowering the quantity of projected light and raising the signal level of the write signal to the optical modulator when the highest brightness as determined from the input image signal is low Therefore, it is possible to display the image with an expanded dynamic range by referring to white as displayed when the quantity of projected light is maximum (the level of the highest brightness of the input image signal is high) and black as displayed with a reduced quantity of projected light. On the other hand, when the quantity of projected light is reduced, it is possible to expand the number of stages of gradation at a low brightness level by modulating and amplifying the write signal to the optical modulator.

What is claimed is:

1. A projection-type image-display apparatus comprising:
   an optical modulator for displaying a gradational image by controlling the condition of transmission or reflection of light;
   a lighting unit for irradiating said optical modulator with light;
   a projection optical system for projecting the light emitted to and transmitted or reflected by said optical modulator;
   write signal processing means for modulating a write signal transmitted to said optical modulator;
   projected light quantity control means for controlling the quality of light transmitted or reflected by said optical modulator, said projected light quantity control means including movable diaphragm means and diaphragm drive means; and
   control signal generation means for controlling said write signal processing means and said projected light quantity control means,
   said control signal generation means controlling the operation of controlling the quantity of projected light of said projected light quantity control means and that of modulating the write signal of said write signal processing means on the basis of the brightness level of the input image signal.

2. An apparatus according to claim 1, wherein said movable diaphragm means is a strip-shaped blind type diaphragm comprising a plurality of strip-shaped blind members revolvable around respective axes of rotation rectangularly extending relative to the incoming projection light and provides a desired opening as said blind members are rotated around the respective axes of rotation by a given angle of rotation, and wherein said diaphragm drive means comprises a cam motor.

3. An apparatus according to claim 2, wherein each of said blind members of the strip-shaped blind type diaphragm is revolvable around an axis of rotation located at an edge of said blind member and is displaced toward the side of the incoming projected light.

4. An apparatus according to claim 2, wherein said strip-shaped blind type diaphragm provides an opening when it is completely closed.

5. An apparatus according to claim 1, wherein said control signal generation means includes
   brightness level computing/processing means for computationally determining the brightness level of the input image signal by computationally determining the largest value of the brightness signal of each pixel of each field or frame of the input image signal as the highest brightness or by computationally obtaining a cumulative histogram for the brightness signal of each pixel and determining the brightness level from which the cumulative histogram is found above a given level as the highest brightness and projected light quantity computing/processing means for computationally determining the quantity of light to be projected from the projection optical system as a function of the computationally determined brightness level,
   said control signal generation means generating a control signal for controlling the projected light quantity control means on the basis of the quantity of projected light as computationally determined by the projected light quantity computing/processing means and a control signal for controlling the write signal processing means on the basis of the brightness level computationally determined by the brightness level computing/processing means and the quantity of projected light computationally determined by the projected light quantity computing/processing means such that the write signal processing means modulates the write signal to amplify it with an amplification ratio that is inversely proportional to the quantity of projected light.

6. An apparatus according to claim 1, wherein said control signal generation means controls said diaphragm drive means so as to broaden an aperture of said movable diaphragm means and controls said write signal processing means so as not to modulate said optical modulator when the brightness level of the input image signal is high, while said control signal generation means controls said diaphragm drive means so as to narrow the aperture of said movable diaphragm means and controls said write signal processing means so as to modulate said optical modulator when the brightness level of the input image signal is low.

* * * * *

UNITED STATES PATENT AND TRADEMARK OFFICE
CERTIFICATE OF CORRECTION

PATENT NO. : 6,592,227 B2
DATED : July 15, 2003
INVENTOR(S) : Akihiro Ouchi et al.

It is certified that error appears in the above-identified patent and that said Letters Patent is hereby corrected as shown below:

<u>Title page,</u>
Item [56], References Cited, FOREIGN PATENT DOCUMENTS,
"63-294540   12/1998" should read -- 63-294540   12/1988 --.

<u>Column 1,</u>
Line 52, "than" should read -- than one --.

<u>Column 7,</u>
Line 23, "drive" should read -- driven --.
Line 58, "low" should read -- low. --.

Signed and Sealed this

Second Day of March, 2004

JON W. DUDAS
*Acting Director of the United States Patent and Trademark Office*